Oct. 11, 1927.  LE RUE P. BENSING  1,645,085
ELECTROLYTIC RECTIFIER
Filed Aug. 31, 1925
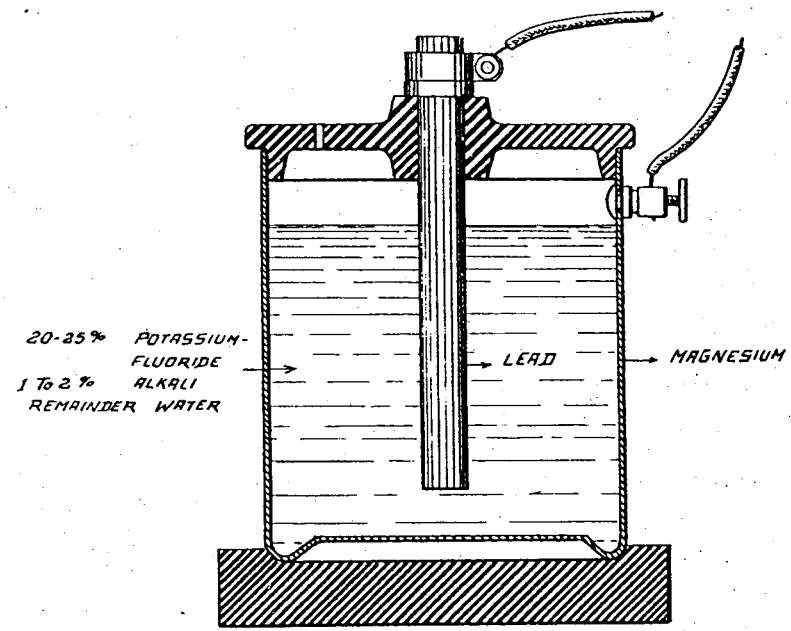
Inventor
LE RUE P. BENSING.
By Fisher, Moser & Moore.
Attorney Patented Oct. 11, 1927.

1,645,085

UNITED STATES PATENT OFFICE.

LE RUE P. BENSING, OF CLEVELAND, OHIO, ASSIGNOR OF ONE-HALF TO GEORGE P. KOELLIKER, OF CLEVELAND HEIGHTS, OHIO.

ELECTROLYTIC RECTIFIER.

Application filed August 31, 1925. Serial No. 53,750.

My invention relates to electrolytic rectifiers, and is an improvement in the electrolytic rectifier disclosed in my application filed May 6, 1925, Serial Number 28,524, in which I use a fluoride as an electrolyte together with magnesium, the electrolyte consisting of approximately twenty-five percent potassium fluoride and seventy-five percent water. In the present case my object is to provide an electrolytic rectifier in which a fluoride electrolyte may be used together with a metallic anode, for example an anode of lead or containing lead. There are many uses for electrolytic rectifiers in which the current density on the anode is relatively high, and I find that with a fluoride electrolyte there is in time a certain tendency toward disintegration of a metallic anode if the current density becomes too great and the temperature of the rectifying cell becomes excessive. Under such conditions I find a magnesium or silicon cathode functions satisfactorily, that is, it has a long life, a thin adherent surface coating, gives high electrical efficiency, etc., especially cathodes of magnesium and silicon used in a fluoride electrolyte. On the other hand, the use of lead or other metallic anodes in that connection offered certain difficulties, but lead anodes are relatively cheap and easy to manufacture, and I have discovered that they may be used as advantageously in a fluoride electrolyte as the magnesium or silicon cathodes mentioned, providing an alkaline media is also used, and where other metals are present additive reagents may also be used, all as hereinafter described and more concisely pointed out in the claims. In the accompanying drawing, the single figure is a sectional view exemplifying one form of an electrolytic rectifier embodying my invention.

Thus, I find in using lead, its alloys, and compounds, that a certain amount of alkalinity of the fluoride electrolyte is required to preserve the lead anode. If, for example, a neutral or acid fluoride is used, enough alkali, a fixed hydroxide or carbonate, must be added to bring the electrolyte alkaline to litmus. An excess of alkali is then added which may vary from a fraction of one percent to several percent depending in large measure upon the nature of the composition of the anode as well as the current density under which it is operated. The function of the alkali may be considered as neutralyzing the small amounts of nascent fluorine liberated at the surface of the anode.

Other steps may be taken for accomplishing this same purpose; for example, an acid or neutral fluoride electrolyte may be used as a rectifying solution together with a carbon or graphite anode. After operating such a rectifier for a given period of time a certain amount of alkalinity is developed. The amount may be predetermined by the length of time the rectifier is operated or by the current density of the anode. When the desired or proper alkalinity of the solution is reached a suitable metallic anode may be substituted for the carbon or graphite electrode and the rectifier will function efficiently in the same way as if a fixed alkali was added.

Therefore I do not desire to limit myself as the particular mode or manner in which the alkalinity is produced in the electrolyte, having found thru experimentation that metallic lead will act as a permanent anode in electrolytes that have been prepared in both ways as herein set forth. I have also found that alloys of lead function similar to the metal itself in such electrolytes, a good example being a copper-lead alloy. When the current densities are not too high and the temperature of the cell is within the proper limits a thin adherent coating is formed on the anodes when employed under the above conditions.

I also find when a lead alloy, containing an element which is soluble in the fluoride electrolyte is used as herein described, that such alloy will function properly as an anode without deterioration, providing small amounts of an acid, the salt or compound of an acid, are added to the fluoride electrolyte. A very good example of this phenomenon is the standard storage battery alloy which consists of an alloy of antimony and lead. This alloy will not give very good service under appreciable current densities when used with an alkaline fluoride electrolyte, excepting when a trace of sulphuric acid, its salts or compounds, are added to the alkaline fluoride electrolyte. In the latter event the disintegration of the anode is prevented.

From the foregoing it will be deduced that a certain chemical balance may be produced in a rectifier using enough fluoride to protect the cathode and enough alkali to protect the lead base of the anode and that with an anode of lead and copper, or antimony and lead, and similar alloys, an additive reagent prevents solution of the alloying element and the lead. For example, two percent, more or less, of a fixed alkali added to a fluoride electrolyte will protect a lead anode, and the addition of three or four drops of concentrated sulphuric acid, or a soluble sulphate may be used as a reagent with a total of 250 cubic centimeters of the alkaline fluoride electrolyte to protect an anode made of lead alloy, say antimony and lead. In either case, a strong thin, adherent protective film or coating is produced upon the surface of the anode thereby assuring a long life and high efficiency thereto.

While it is especially advantageous to employ lead or a lead alloy for an anode in a fluoride electrolytic rectifier of the kind described herein, it should be understood that the improvement in its broader aspects embraces anodes of copper, nickel, and the like, or alloys of such metals, in which the predominating metallic constituent is resistant to aqueous hydroxide solutions and forms a slightly soluble or insoluble fluoride.

What I claim, is:

1. An electrolytic rectifier, comprising a lead anode, a cathode, and an aqueous fluoride electrolyte having a small per cent of alkalinity, the fluoride being in excess of the alkali and at least five percent of the aqueous solution.

2. In an electrolytic rectifier, a cathode comprising magnesium, an anode comprising lead, and an alkalescent fluoride electrolyte, the fluoride being in excess of the alkali.

3. In an electrolytic rectifier, a metallic anode resistant to alkalies and fluorides, in combination with an alkaline aqueous fluoride, the fluoride being in preponderating amount compared with all other salts present.

4. In an electrolytic rectifier, an anode made of lead alloy, and an alkaline aqueous fluoride electrolyte, containing a trace of sulphuric acid, the fluoride being in preponderating amount compared with all other salts present.

5. In an electrolytic rectifier, a potassium fluoride solution, a cathode of magnesium, the fluoride being in excess of one percent, and an alkali slightly in excess of the amount required to bring the electrolyte alkaline to litmus.

In testimony whereof I affix my signature.

LE RUE P. BENSING.